(12) United States Patent
Lee et al.

(10) Patent No.: US 11,616,423 B1
(45) Date of Patent: *Mar. 28, 2023

(54) PRINTED CIRCUIT BOARD STATOR WINDING ENHANCEMENTS FOR AXIAL FIELD ROTARY ENERGY DEVICE

(71) Applicant: INFINITUM ELECTRIC, INC., Round Rock, TX (US)

(72) Inventors: Rich Lee, Liberty Lake, WA (US); Paulo Guedes-Pinto, Round Rock, TX (US)

(73) Assignee: INFINITUM ELECTRIC, INC., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/880,817

(22) Filed: Aug. 4, 2022

Related U.S. Application Data

(63) Continuation of application No. 17/688,451, filed on Mar. 7, 2022, now Pat. No. 11,502,583.

(51) Int. Cl.
| | | |
|---|---|---|
| *H02K 11/30* | (2016.01) | |
| *H02K 35/02* | (2006.01) | |
| *H02K 1/2798* | (2022.01) | |
| *H02K 1/14* | (2006.01) | |

(52) U.S. Cl.
CPC ............ *H02K 11/30* (2016.01); *H02K 1/146* (2013.01); *H02K 1/2798* (2022.01); *H02K 35/02* (2013.01); *H02K 2211/03* (2013.01)

(58) Field of Classification Search
CPC ...... H02K 11/30; H02K 1/2798; H02K 1/146; H02K 35/02; H02K 2211/03; H02K 1/2793; H02K 16/02; H02K 3/26; H02K 1/182; H02K 3/28
USPC ........................................................ 310/194
See application file for complete search history.

(56) References Cited

U.S. PATENT DOCUMENTS

| | | |
|---|---|---|
| 8,736,133 B1 | 5/2014 | Smith et al. |
| 10,135,310 B2 | 11/2018 | Schuler et al. |
| 10,141,803 B2 | 11/2018 | Schuler et al. |
| 10,141,804 B2 | 11/2018 | Schuler et al. |
| 10,186,922 B2 | 1/2019 | Schuler et al. |
| 10,340,760 B2 | 7/2019 | Schuler et al. |
| 2018/0219445 A1* | 8/2018 | Jore .................. H02K 1/12 |
| 2019/0238018 A1 | 8/2019 | Schuler et al. |

* cited by examiner

*Primary Examiner* — Alexander A Singh
(74) *Attorney, Agent, or Firm* — Dickinson Wright PLLC

(57) ABSTRACT

A motor includes a stator and a rotor having an axis of rotation and a magnet. The stator includes a PCB having PCB panels. Each PCB panel is assigned to one electrical phase. Each PCB panel has a pair of PCB layers. Each PCB layer includes coils, and each coil in each PCB layer of a PCB panel is circumferentially aligned with a corresponding coil in another PCB layer. One coil in one PCB layer is coupled to a corresponding coil in another PCB layer with a via. A number of turns in each coil is a multiple of a number of electrical phases configured for the PCB stator. In addition, the vias that connect two coils in a pair of PCB layers that belong to a same electrical phase do not intersect coils in PCB layers that belong to other electrical phases of the PCB stator.

11 Claims, 12 Drawing Sheets

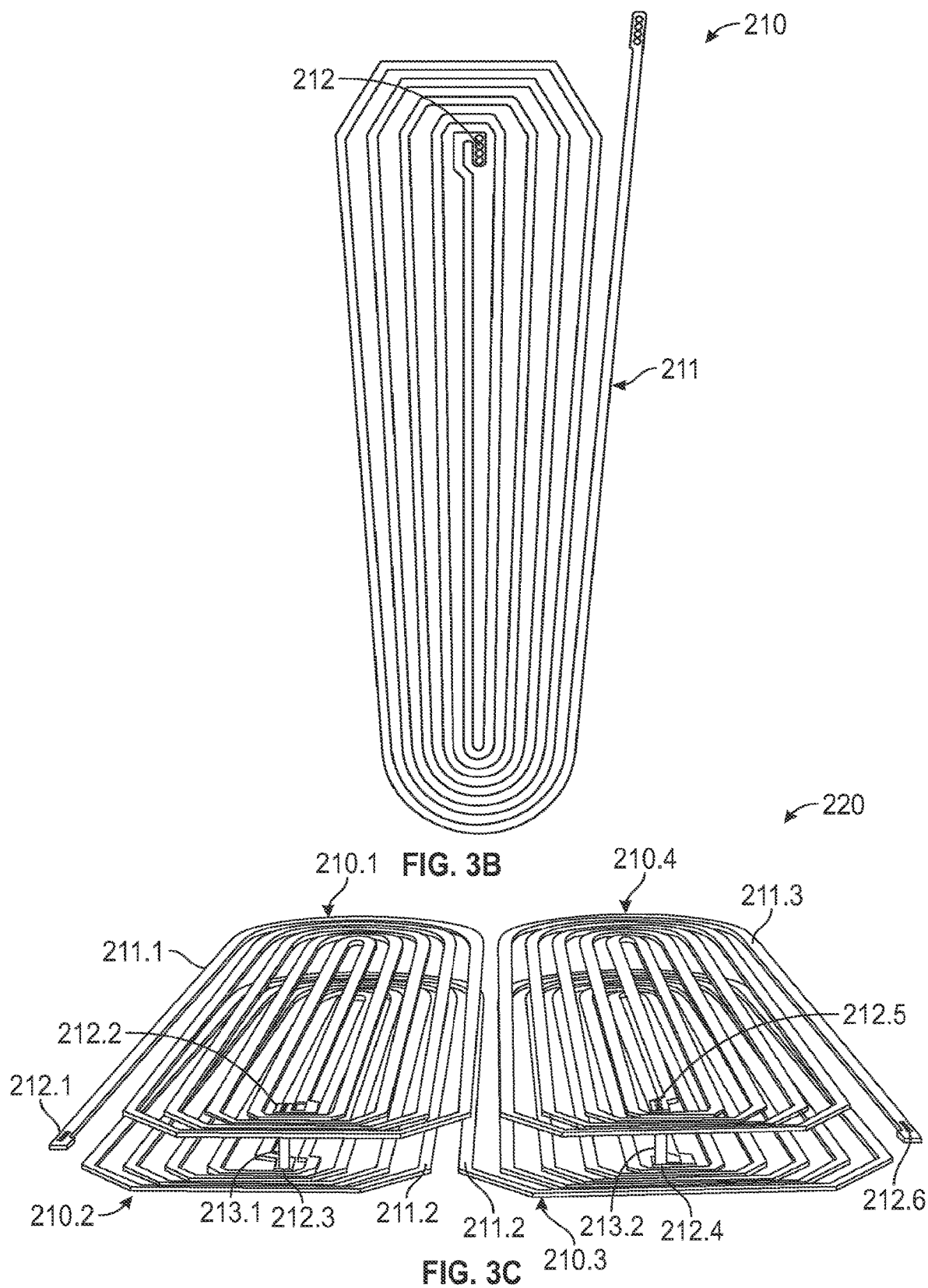

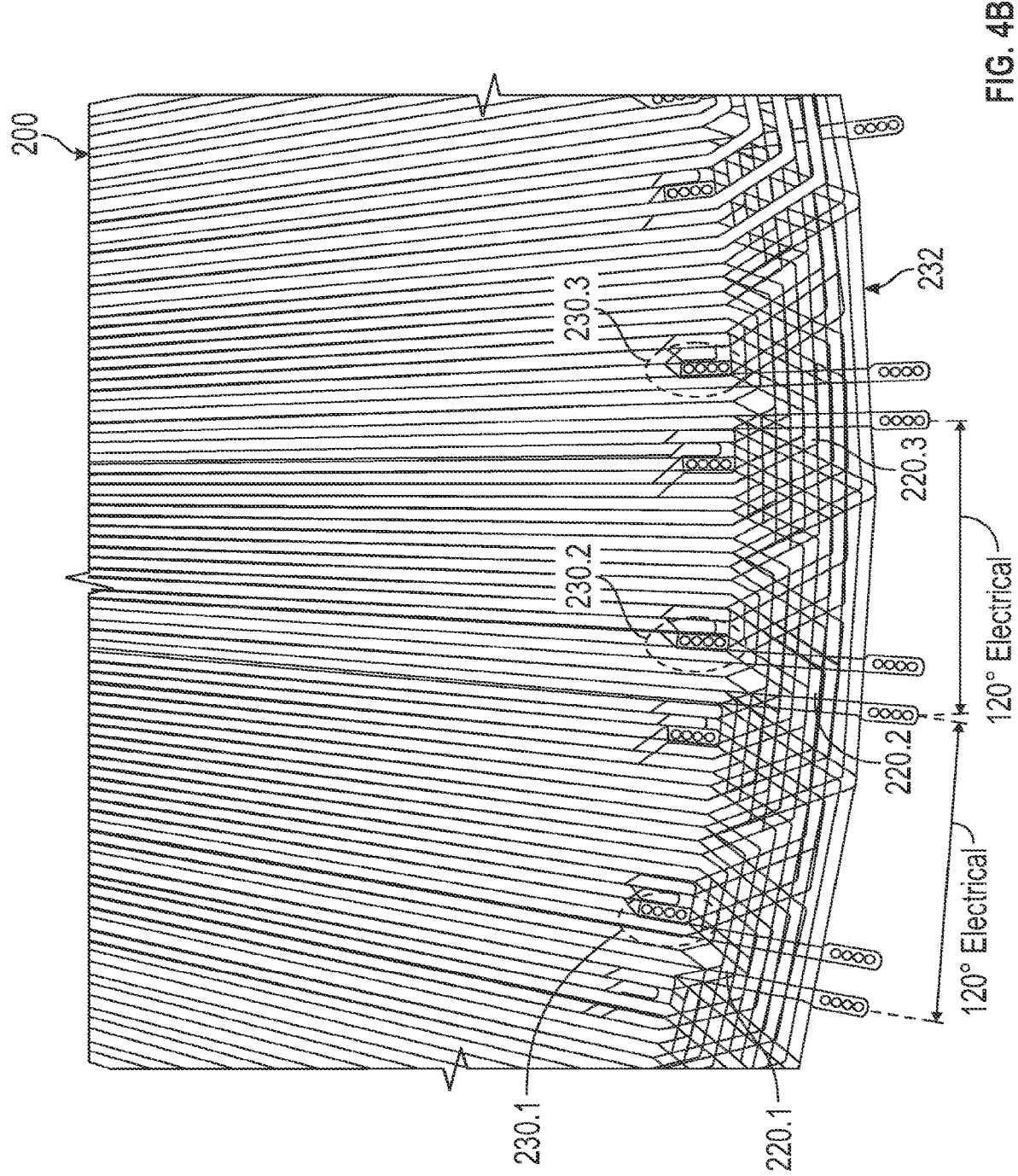

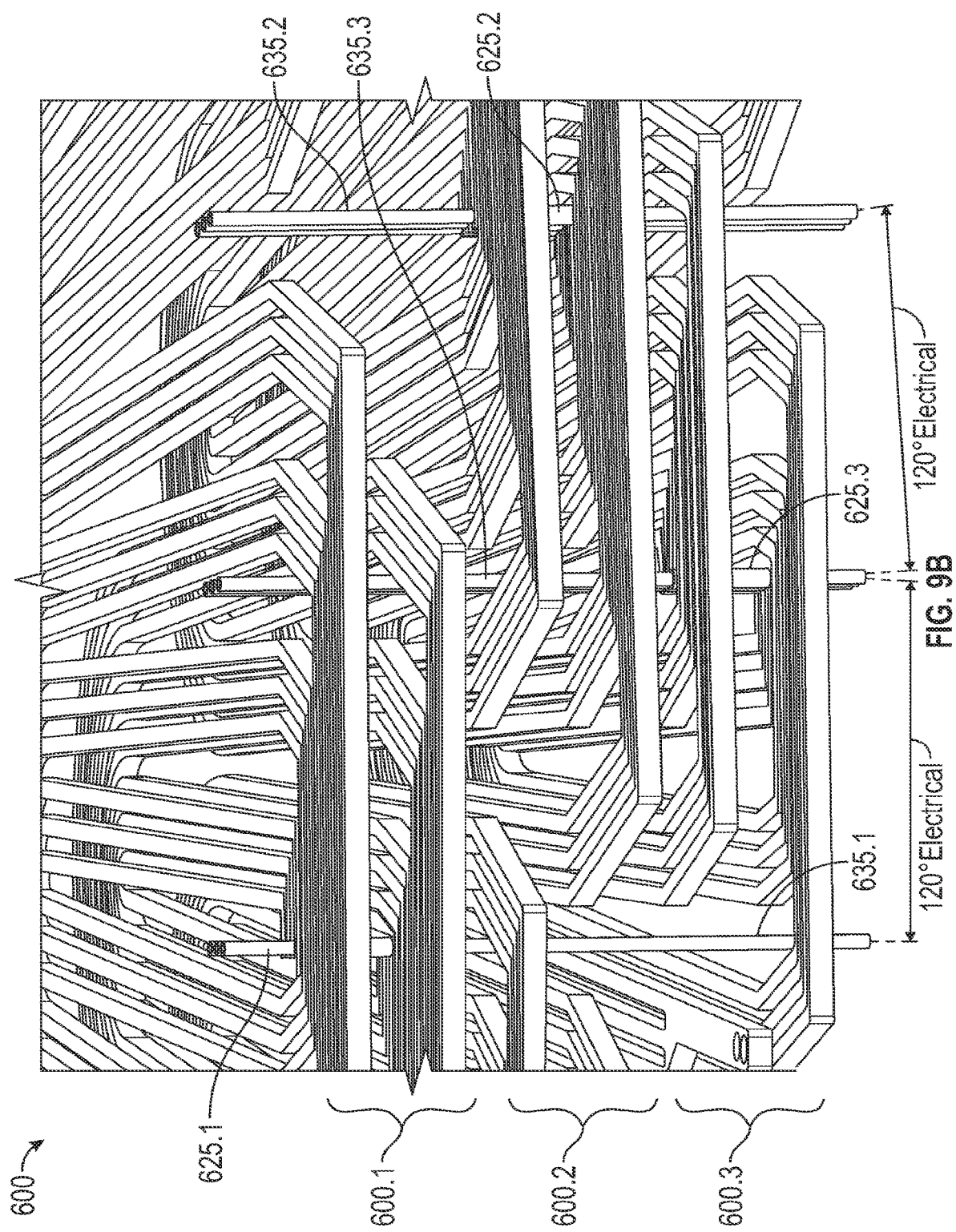

PRINTED CIRCUIT BOARD STATOR WINDING ENHANCEMENTS FOR AXIAL FIELD ROTARY ENERGY DEVICE

This application is a continuation of and claims priority to and the benefit of U.S. patent application Ser. No. 17/688,451, filed Mar. 7, 2022, titled "Printed Circuit Board Stator Winding Enhancements for Axial Field Rotary Energy Device", the contents of which are incorporated herein by reference in their entirety.

BACKGROUND

Field of the Disclosure

The present disclosure relates in general to an axial field rotary energy device and, in particular, to a system, method and apparatus for motors and generators having one or more printed circuit board (PCB) stators.

Description of the Prior Art

Some axial field electric machines, such as motors or generators, use printed circuit board (PCB) stator structures. Examples of such apparatuses are described in U.S. Pat. Nos. 10,141,803, 10,135,310, 10,340,760, 10,141,804 and 10,186,922, each of which is incorporated herein by reference in its entirety. These PCB stator structures are produced through a combination of etching, laminating, drilling and plating operations that can be repeated until a complete PCB stator is obtained. While the manufacturing process of these PCB stators is well established, it is desirable to simplify the manufacturing process to reduce costs. Some PCB stator designs require the PCB stator to be split into PCB panels that are processed individually, namely going through etching, laminating, drilling and plating operations, then undergoing additional laminating, drilling, and plating operations. By selecting and applying design features to the PCB stator, some of the previously mentioned repetitive operations can be eliminated resulting in a faster and more economical manufacturing process.

SUMMARY

Embodiments of an axial field rotary energy device are disclosed. For example, a device can include a stator and a rotor having an axis of rotation and a magnet. The stator can include a PCB having PCB panels. Each PCB panel can be assigned to one electrical phase. Each PCB panel can have a pair of PCB layers. Each PCB layer can include coils. Each coil in each PCB layer of a PCB panel can be circumferentially aligned with a corresponding coil in another PCB layer. One coil in one PCB layer can be coupled to a corresponding coil in another PCB layer with a via. A number of turns in each coil can be a multiple of a number of electrical phases configured for the PCB stator. In addition, the vias that connect two coils in a pair of PCB layers that belong to a same electrical phase, can be configured to not intersect coils in PCB layers that belong to other electrical phases of the PCB stator.

BRIEF DESCRIPTION OF THE DRAWINGS

So that the manner in which the features and advantages of the embodiments are attained and can be understood in more detail, a more particular description can be had by reference to the embodiments thereof that are illustrated in the appended drawings. However, the drawings illustrate only some embodiments and therefore are not to be considered limiting in scope as there can be other equally effective embodiments.

FIG. 3B is an enlarged front view of an embodiment of a coil in the PCB stator of FIG. 3A.

FIG. 3C is an exploded, isometric side view of an embodiment of a set of coils, namely a coil subassembly, in the PCB stator of FIG. 3A where the dielectric layers are not shown and the via length is increased for ease of understanding.

FIG. 4B is a partial top view of a portion of an embodiment of the PCB stator of FIG. 4A.

FIG. 9B is an enlarged, exploded, isometric view of a portion of the PCB stator of FIG. 9A.

DETAILED DESCRIPTION

Figure 1:
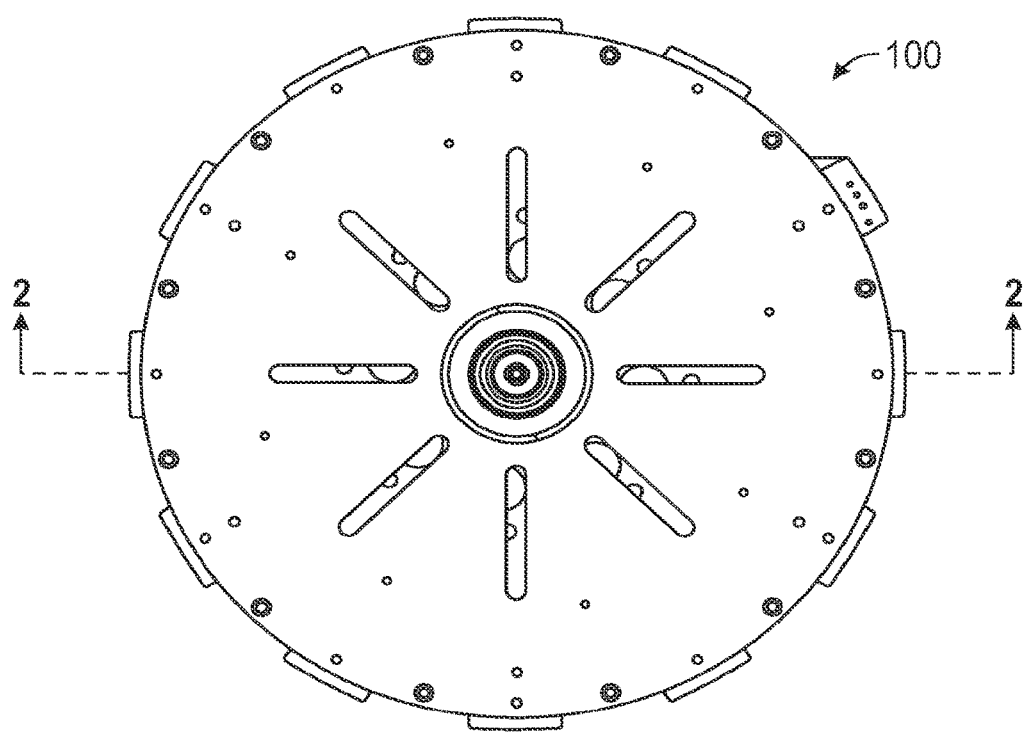
FIG. 1 is a front view of an embodiment of an axial field rotary energy device.
Figure 2:
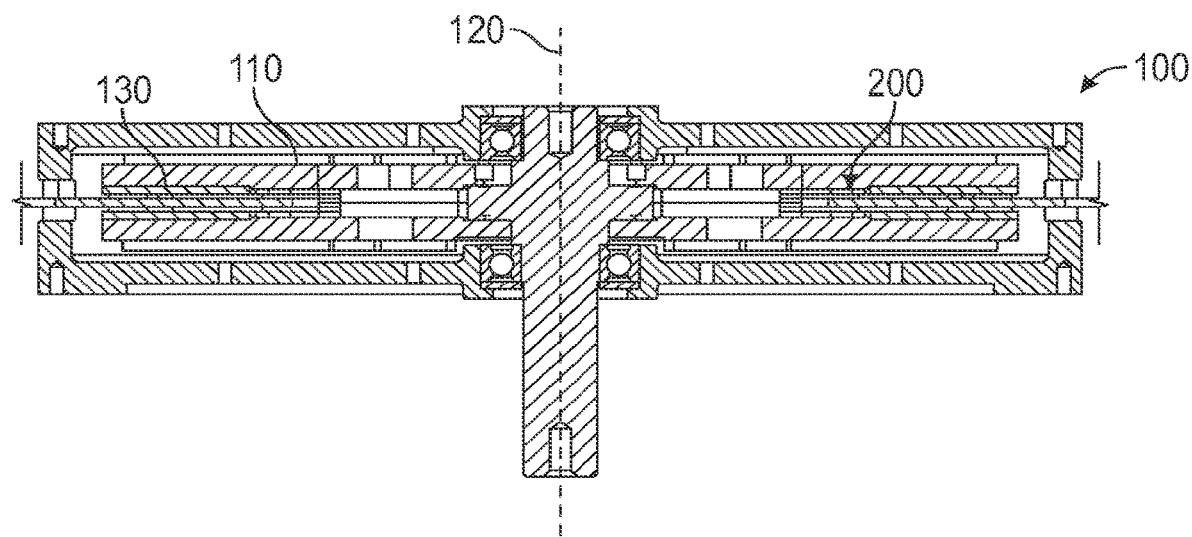
FIG. 2 is a sectional side view of the device of FIG. 1 taken along section line 2-2 of FIG. 1.

FIGS. 1-9 disclose various embodiments of axial field rotary energy devices. Some axial field electric machines can include one, two or more PCB stators, such as one for each electrical phase of the machine. FIGS. 1 and 2 depict a typical multiphase axial field rotary energy device, or multiphase device 100. The multiphase device 100 can include at least one rotor 110 (two shown, in FIG. 2) with an axis of rotation 120. Each rotor 110 can comprise at least one magnet 130. The multiphase device 100 can also include at least one PCB stator 200 that is coaxial with the rotor 110.

Figure 3A:
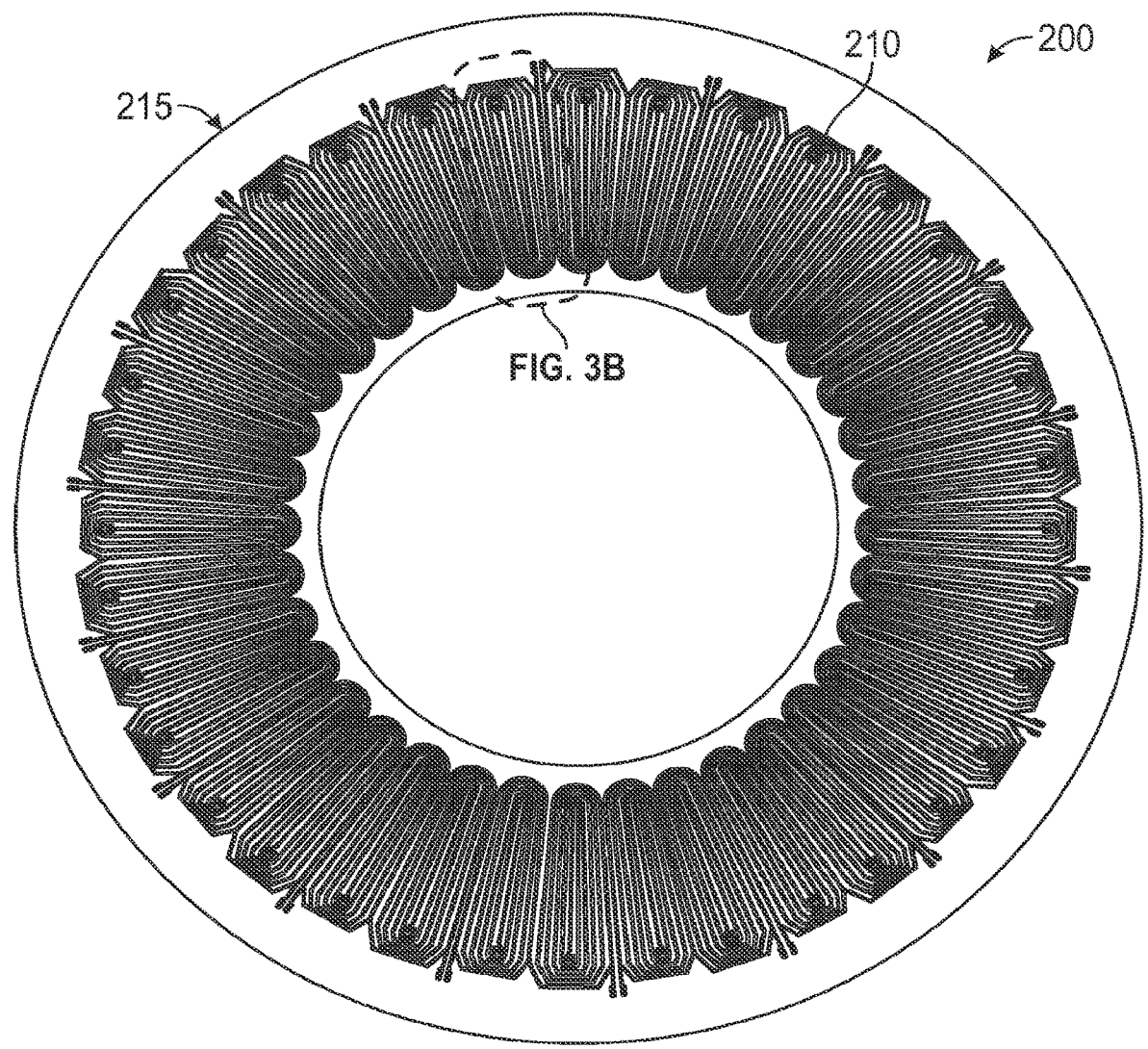
FIG. 3A is a front view of an embodiment of a PCB stator.

Each PCB stator 200, as shown in FIG. 3A, can include a plurality of coils 210 etched, for example, in the copper foil of a laminated structure of the PCB. The coils 210 can be supported by a dielectric structure 215 made of, for example, epoxy-glass laminate, polyimide-glass laminate, or PTFE-ceramic laminate. The coils 210 can include multiple turns depending on the design of the PCB stator 200. The coils 210 in the PCB stator 200 can be interconnected by means of traces (not shown in FIG. 3A) etched in the copper foil of a PCB laminate structure to form north and south poles. While FIG. 3A shows an example of a 36-pole stator, many other pole configurations are possible.

FIG. 3B depicts a coil 210 in more detail. Coil 210 can be formed as a continuous conductive trace 211 that can be etched out of a layer of copper foil laminated on a dielectric laminate such as FR4 glass-epoxy laminate, for example. The continuous conductive trace 211 of coil 210 can have perforations 212 at both of its terminal ends. The perforations 212 can connect coil 210 to other coils in the PCB stator 200. Although coil 210 is shown as having 5-turns, other PCB stators may have coils with different numbers of turns.

FIG. 3C shows an embodiment where the coils are interconnected to form a continuous path, which is hereinafter referred to as a coil subassembly 220. In FIG. 3C, the dielectric material of the PCB laminate structure is not shown for better visualization of the coil structure. In the coil subassembly 220, a first coil 210.1 located on one layer of the PCB structure can have a first terminal 212.1 that can be connected to other coils, or to an external voltage source such as a variable frequency drive (VFD). A trace 211.1 can be etched on the copper of a PCB laminate structure to form turns that are terminated at a second terminal 212.2. The second terminal 212.2 is coupled to a third terminal 212.3, that is part of a second coil 210.2 located in another layer of the PCB structure, by means of a via, such as a plated via 213.1. The second coil 210.2 can have a trace 211.2 that can be etched on the copper of the PCB laminate structure to form turns. The trace 211.2 can seamlessly connect and form turns of a third coil 210.3 that terminates at a fourth terminal 212.4. The fourth terminal 212.4 can be coupled to a fifth terminal 212.5 that is part of a fourth coil 210.4 located in the same PCB layer as the first coil 210.1. The fourth coil 210.4 can have a trace 211.3 that can be etched on the copper of the PCB laminate structure to form turns and terminate at a sixth terminal 212.6. The sixth terminal 212.6 can be connected to still other coils, or to an external voltage source such as a VFD. Although coil subassembly 220 is shown as having coils with 5 turns, it should be understood that other coil subassemblies can have different numbers of turns.

Figure 4A:
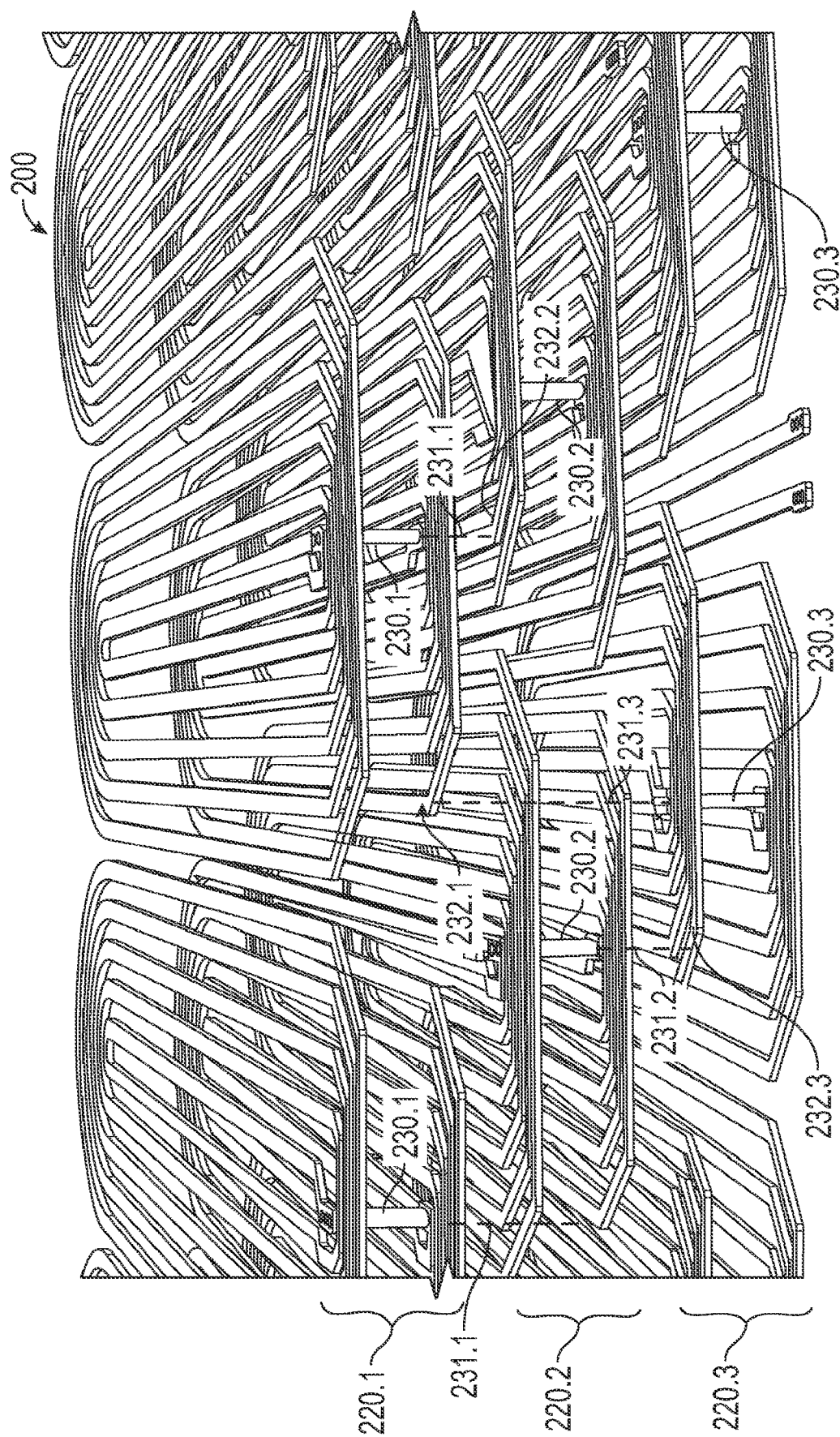
FIG. 4A is an exploded, isometric view of an embodiment of a PCB stator where the dielectric layers are not shown, and the via length is increased for better visualization.

FIGS. 4A and 4B show partial views of an embodiment of the PCB stator 200 where the dielectric material is not shown and the length of the vias is increased for better visualization. FIG. 4A shows an example of a 3-phase PCB stator with two layers per phase. Each pair of layers can form a PCB panel that comprises a plurality of coil subassemblies 220.1, 220.2 and 220.3, respectively. Each PCB panel can be assigned to one electrical phase. Each coil subassembly 220.1, 220.2, 220.3 can comprise a set of plated vias 230.1, 230.2 and 230.3, respectively, that connect the coils in each coil subassembly 220.1, 220.2, 220.3 to form a continuous path.

FIG. 4B shows that the stator panels, and therefore the coil subassemblies, can be rotatably shifted relative to each other by 120 electrical degrees, which is 360 electrical degrees divided by the number of phases. Hereinafter, it should be noted that 360 electrical degrees cover the angular span of two consecutive poles, or a pair of poles. The PCB stator example shown in FIGS. 3A-4B has 36 poles. Thus, each pole in this one example has a physical span of 10 mechanical degrees and a pair of poles has a physical span of 20 mechanical degrees. In this example, 360 electrical degrees are equivalent to 20 mechanical degrees and 120 electrical degrees are equivalent to 6.67 mechanical degrees. The formula for this conversion is: mechanical degrees=electrical degrees/number of pairs of poles.

Although FIGS. 4A and 4B show a 3-phase stator structure, it should be understood that PCB stators can have 2, 4, 5, 6, or another number of phases. It should also be noted that although each phase in PCB stator 200 has one pair of layers per phase, other PCB stators can have 2, 3, 4 or more pairs of layers per phase.

In the example shown in FIGS. 4A and 4B, it can be seen that if one of the vias 230.1 in coil subassembly 220.1 was extended along the line 231.1, which is substantially co-linear with said one of the vias 230.1, it would intersect the trace 232.2 in coil subassembly 230.2. Similarly, if one of the vias 230.2 in coil subassembly 220.2 was extended along line 231.2, which is substantially co-linear with said one of the vias 230.2, it would intersect the trace 232.3 in coil subassembly 230.3. Finally, if one of the vias 230.3 in coil subassembly 220.3 was extended along line 231.3, which is substantially co-linear with said one of the vias 230.3, it would intersect trace 232.1 in coil subassembly 230.1.

FIG. 4B shows a top view of the PCB stator 200 where the locations of vias 230.1, 230.2 and 230.3 are indicated. Similarly to FIG. 4A, it can be seen that vias 230.1, which are in coil subassembly 220.1, are substantially vertically aligned with traces 232 from other layers. Similarly, vias 230.2, which are in coil subassembly 220.2, are substantially vertically aligned with traces 232 from other layers. Finally, vias 230.3 of coil subassembly 220.3 are substantially vertically aligned with traces 232 from other layers. As this vertical alignment can cause vias to intersect traces in other PCB layers it requires that, during the PCB manufacturing process, each PCB panel can undergo the manufacturing process depicted in FIG. 5.

Figure 5:
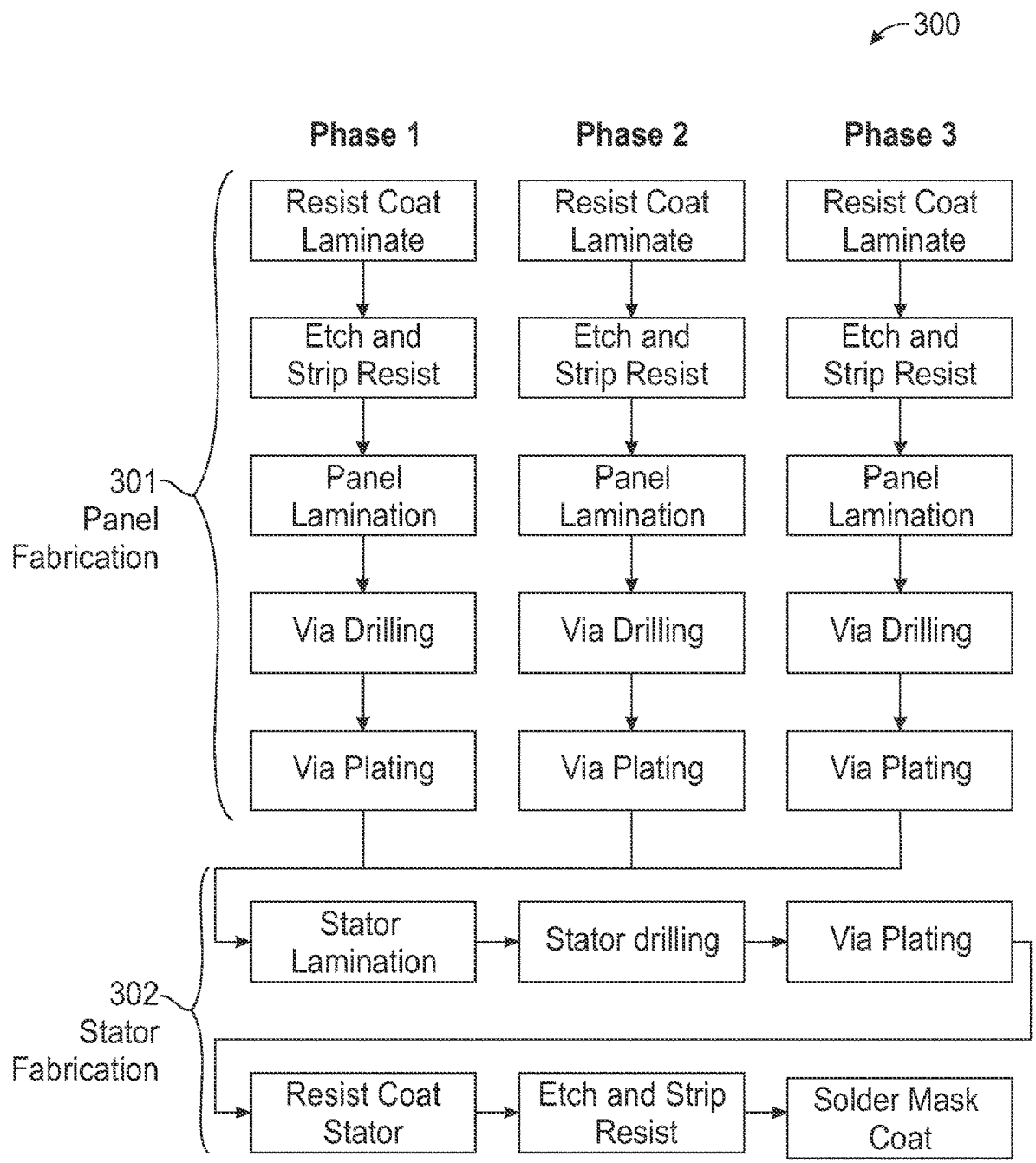
FIG. 5 is a process flow chart for manufacturing an embodiment of a PCB stator.

FIG. 5 shows a flow diagram of an embodiment of a manufacturing process 300 for a PCB stator were vias could intersect traces as depicted in the example in FIGS. 4A and 4B. In the process shown in FIG. 5, each PCB panel can undergo the process 301 that can include application of a photoresist, etching, resist stripping, panel lamination, via drilling and via plating. The process can be repeated for each phase of the PCB panel. After that, the phases panels of the PCB stators can undergo process 302, where they are laminated together to form the complete PCB stator. Subsequently, they can be drilled, plated, coated with resist, etched, stripped of remaining resist and coated with a solder mask, for example. Although FIG. 5 describes a process for a stator with three PCB panels with one panel per electrical phase, it should be understood that other PCB stators can have 2, 4, 5, 6 or more PCB panels with one panel per phase, so the process 301 can match the number of panels and/or phases.

In the example depicted in FIGS. 4A and 4B, the reason that the vias 230.1, 230.2, 230.3 can intersect the other coil traces is because the number of coil turns is not a multiple of the number of phases. The example in FIGS. 4A and 4B has coils with 5 turns which is not a multiple of 3, which is the number of phases.

Figure 6A:
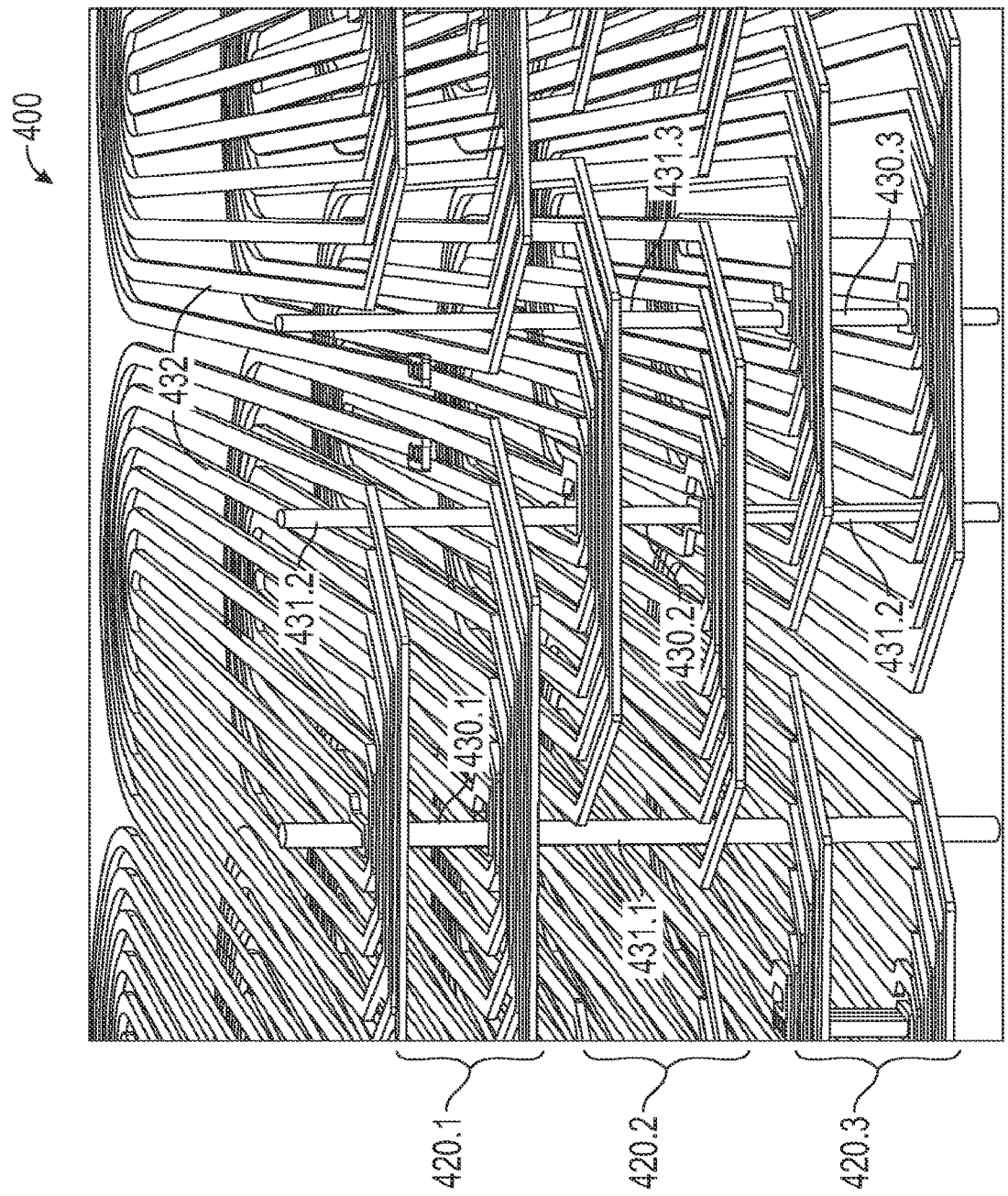
FIG. 6A is an exploded, isometric view of a portion of an embodiment of a PCB stator where the dielectric layers are not shown and the via length is increased for ease of understanding.
Figure 6B:
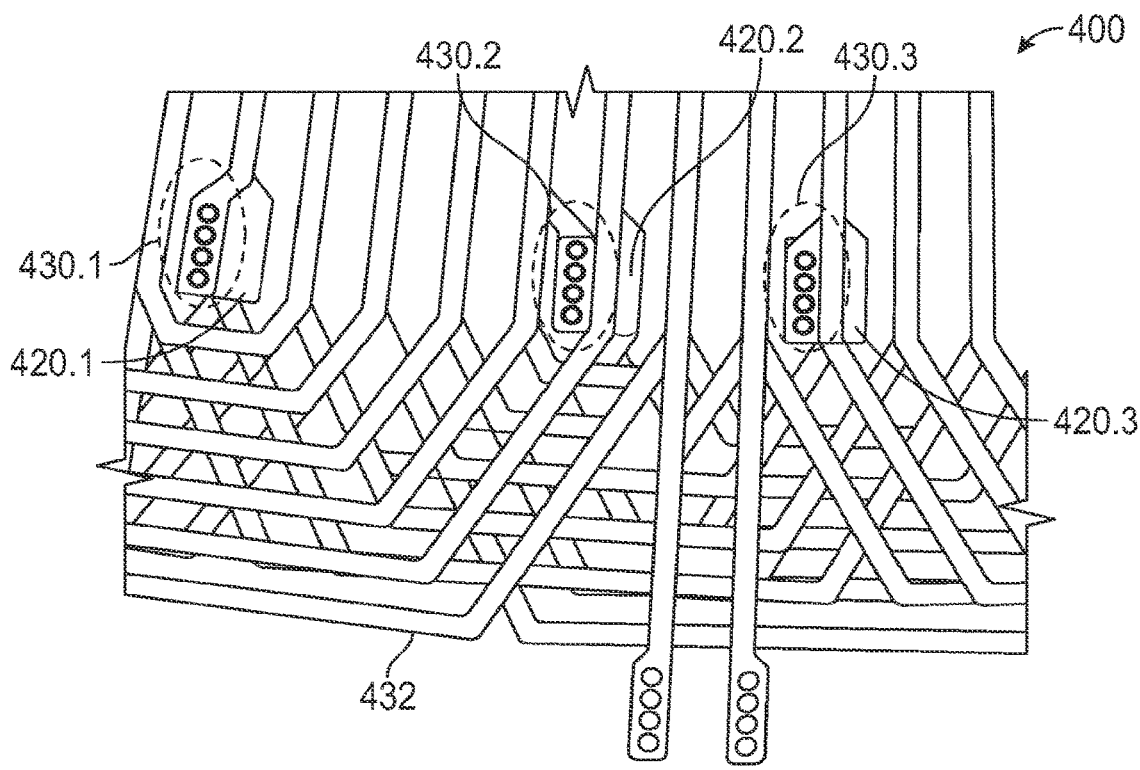
FIG. 6B is a top view of a portion of the stator of FIG. 6A.

In contrast, FIGS. 6A and 6B show an example of a 3-phase PCB stator 400 that have coils with 6 turns, which is multiple of 3, which is the number of phases in PCB stator 400. In FIGS. 6A and 6B, the dielectric material is not shown and the length of the vias are increased for easier visualization. In this example, the 3-phase PCB stator 400 has 2 layers per phase. Each pair of layers can form a PCB panel that comprises a plurality of coil subassemblies 420.1, 420.2 and 420.3, respectively, and each PCB panel can be assigned to one electrical phase. Each coil subassembly can comprise a set of plated vias 430.1, 430.2 and 430.3, respectively, that connects the coils in each coil subassembly 420.1, 420.2, 420.3 to form a continuous path. Similarly to the example shown in FIGS. 4A and 4B, the PCB stator panels in FIGS. 6A and 6B are rotatably shifted relative to each other by 120 electrical degrees, which is 360 electrical degrees divided by the number of phases. It should be noted that although each phase in PCB stator 400 has one pair of layers, other PCB stators can have 2, 3, 4 or more pairs of layers per phase.

In the example shown in FIGS. 6A and 6B, it can be seen that via 430.1 in coil subassembly 420.1 can be extended along the line 431.1, which is substantially co-linear with via 430.1, without intersecting any traces 432 in any other layers. Similarly, via 430.2 in coil subassembly 420.2 can be extended along the line 431.2, which is substantially co-linear with via 430.2, without intersecting any traces 432 in any other layers. Finally, via 430.3 in coil subassembly 420.3 can be extended along the line 431.3, which is substantially co-linear with via 430.3 without intersecting any traces 432 in any other layers.

FIG. 6B shows a top view of PCB stator 400 where the vias 430.1, 430.2 and 430.3 are indicated. It can be seen that the vias 430.1, 430.2, 430.3 do not intersect any traces 432 other than the traces in the layers that form the coils they are coupled to. In this embodiment where the number of turns of the coils is a multiple of the number of electrical phases, a via and its extension will intersect traces only in coils that belong to layers associated to that one phase. Said via and its extension will not intersect traces in coils that belong to layers associated with the other phases.

Figure 7:
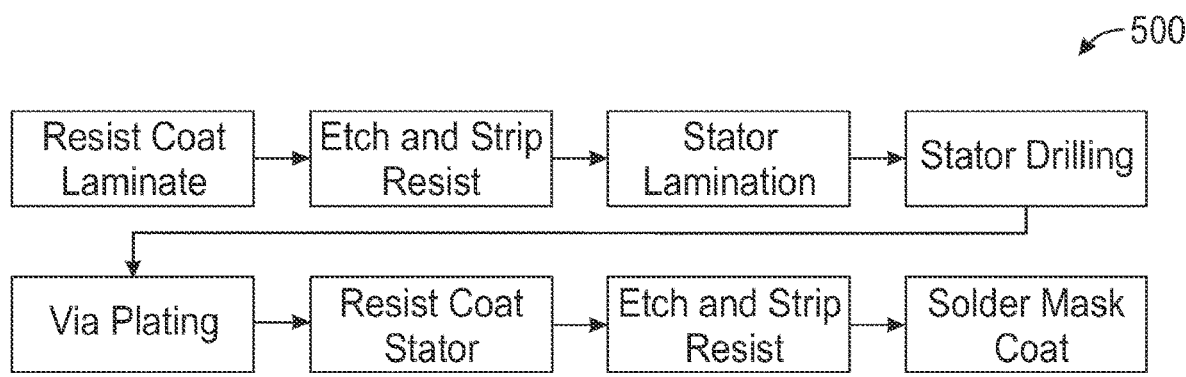
FIG. 7 is a process flow chart for manufacturing an embodiment of a PCB stator.

The via arrangement depicted in FIGS. 6A and 6B allows for a PCB manufacturing process 500 depicted in FIG. 7, which has fewer steps than the manufacturing process 300 depicted in FIG. 5. This is because all PCB stator layers can be laminated, via drilled and plated in one single step, which is faster and more economical than the manufacturing process 300 depicted in FIG. 5.

Due to requirements of axial field electric machine applications such as power, current and voltage, the PCB stator can have coils connected in series, parallel, or a combination of both. In some embodiments, each coil of the PCB stator can have two or more parallel traces. Thus, the current flowing through the coils of the PCB stator can be split among parallel traces. In those cases where parallel traces are employed, however, embodiments of the traces do not intersect each other along the coils, because that would create paths for eddy current circulation, which would create eddy current losses and degrade machine efficiency.

Figure 8A:
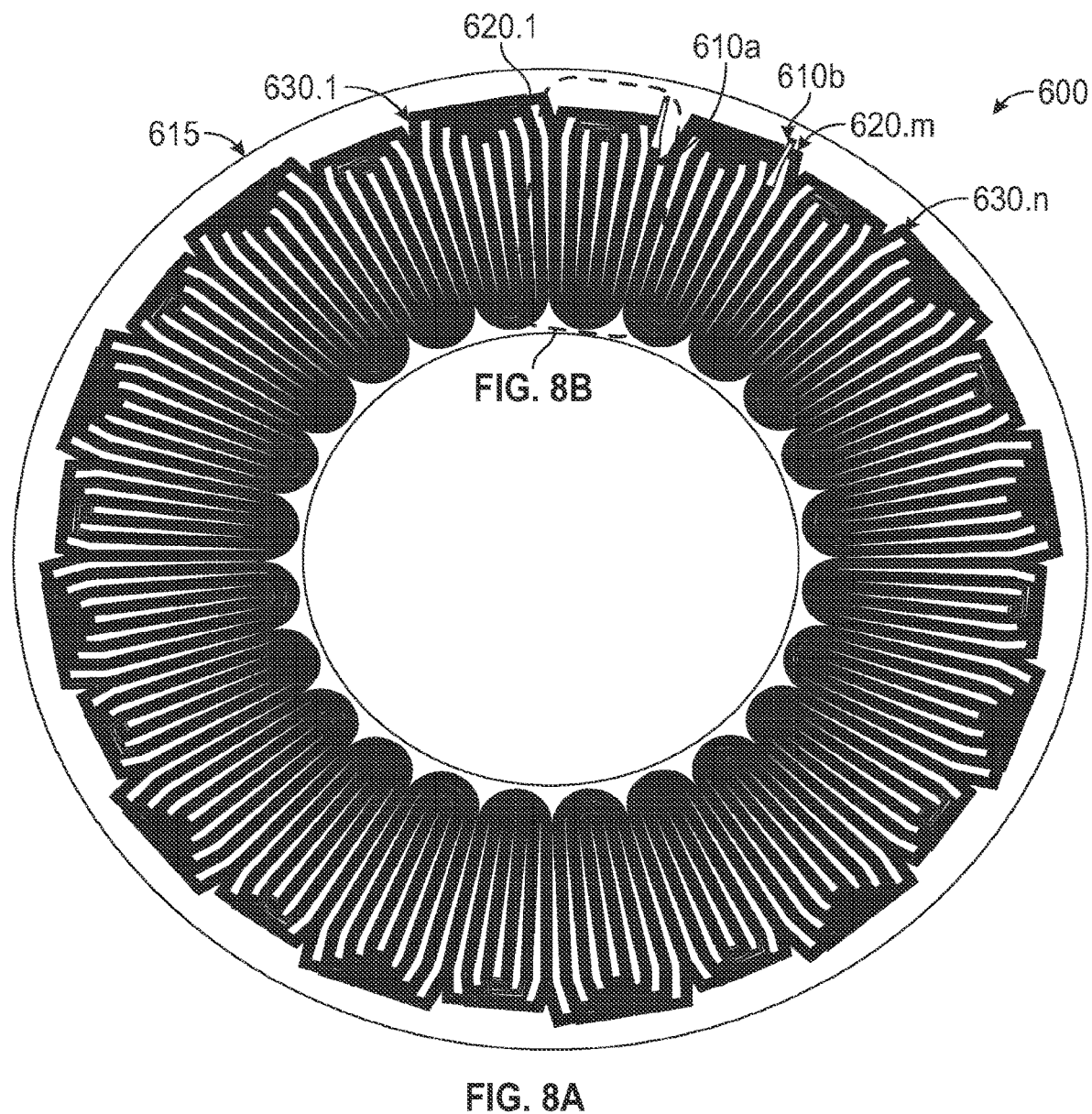
FIG. 8A is a front view of an embodiment of a PCB stator where coils have parallel traces.

FIG. 8A shows an example of a PCB stator 600 with parallel traces that can include a plurality of coils 610, 620.1 through 620.$m$, and coils 630.1 through 630.$n$. The coils may be etched, for example, in the copper foil of a laminated structure of the PCB. These copper coils can be supported by a dielectric structure 615 formed from, for example, epoxy-glass laminate, polyimide-glass laminate, or PTFE-ceramic laminate. The coils 610, 620.1 through 620.$m$, and 630.1 through 630.$n$ can include multiple turns depending on the design of the PCB stator. While FIG. 8A shows an example of a 24-pole stator, many other pole configurations are possible. The PCB stator example shown in FIG. 8A has three turns per coil, however, other PCB stators can have coils with other numbers of turns.

Figure 8B:
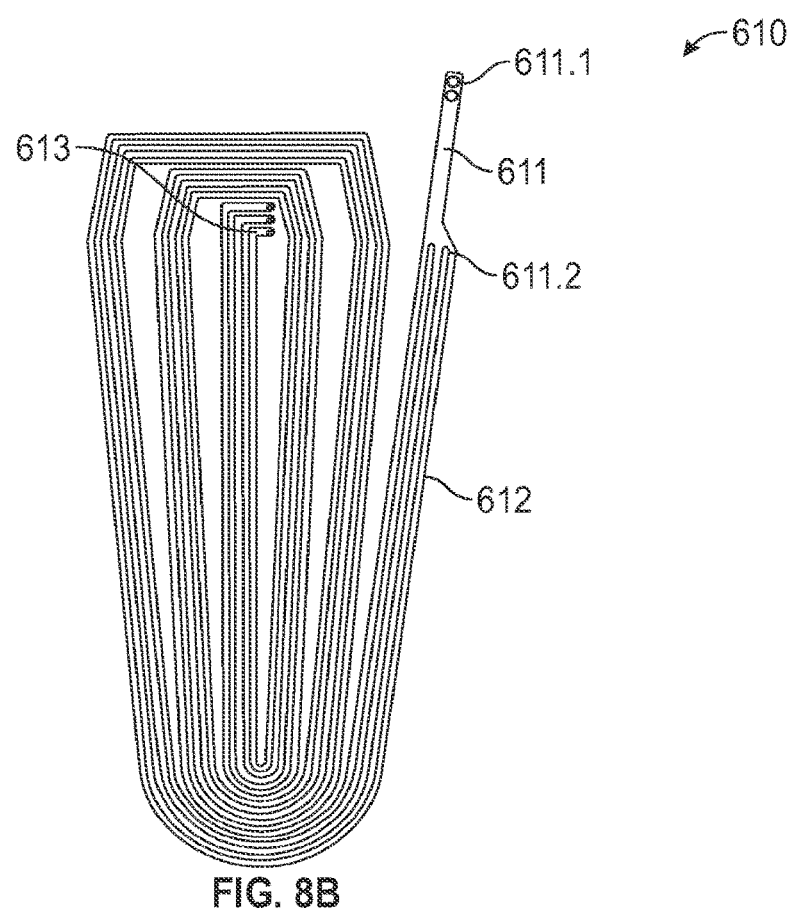
FIG. 8B is an enlarged front view of an embodiment of a coil in the PCB stator of FIG. 8A.

FIG. 8B shows an embodiment of an individual coil 610 which can have a terminal 611 that can be connected to an external voltage source, such as a VFD, at a first end 611.1. At a second end 611.2, the terminal 611 can be split into multiple parallel traces 612 that form the coil 610. Although FIG. 8B shows the coil 610 with three parallel traces 612, other embodiments can have coils with two, four, five or more parallel traces, or just one single trace. Each trace 612 in coil 610 (which, in FIG. 8A, is the coil 610$a$, on the left) terminates in a respective terminal 613 (FIG. 8B). The terminals 613 are not connected to each other in any of the coils 610$a$, 620.1 through 620.$m$, or 630.1 to 630.$n$, until they circumscribe (in a counter-clockwise direction, in FIG. 8A) the entire PCB stator 600. The only point where the traces 612 reconnect is the second end 611.2 of terminal 611 of the second coil 610$b$ (on the right side of FIG. 8A). Thus, the current from the external source can enter at coil 610$a$ (via terminal 611), split into traces 612 and then exit at the terminal 611 of coil 610$b$.

Figure 8C:
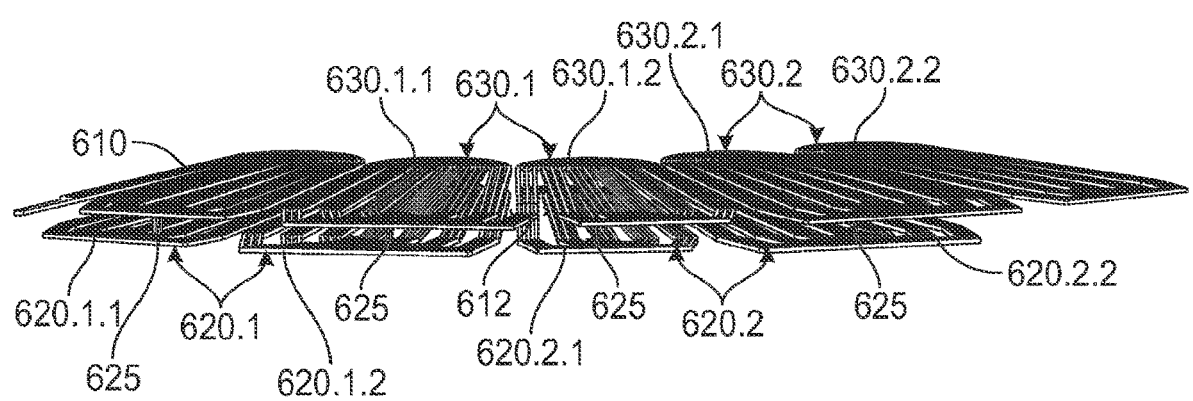
FIG. 8C is an exploded, isometric view of an embodiment of a set of coils in the PCB stator of FIG. 8A.

FIG. 8C shows a detailed view of an embodiment of a PCB stator where the dielectric structure is not shown for ease of understanding. In some versions, the coil 610 can be in one layer and connected to a coil 620.1 in another layer with vias 625. Coil 620.1 can have a first part 620.1.1 that can be circumferentially aligned with coil 610. A second part 620.1.2 can be in the same layer and adjacent to the first part 620.1.1 to form a continuous path of three non-intersecting traces. The second part 620.1.2 can be connected (with vias 625) to a first part 630.1.1 of a coil 630.1 that is in the same layer as coil 610. Second part 620.1.2 and first part 630.1.1 can be circumferentially aligned.

The second part 630.1.2 of coil 630.1 can be connected with vias 625 to a first part 620.2.1 of a coil 620.2 that is located in the same layer as the coil 620.1. Coils 620.1 and 620.2 can be identical to each other. Second part 630.1.2 and 620.2.1 can be circumferentially aligned. The second part 620.2.2 of the coil 620.2 can be connected to the first part 630.2.1 of a coil 630.2 that is located in the same layer as the coil 630.1 and coil 610. Coils 6301. And 630.2 can be identical to each other. Coils 620.2.2 and 630.2.1 can be circumferentially aligned. This pattern can repeat for the entire circumference of the PCB stator for up to coils 620.$m$ and 630.$n$. In an example, the second part 620.$m$.2 of the last coil 620.$m$ can connect to another coil 610 (which can be identical to the original coil 610), as shown in FIG. 8A.

In these embodiments, the traces 612 (FIGS. 8B and 8C) only intersect each other at the terminals 611 at both ends of the PCB stator panel winding. A continuous serial path is formed through the vias connections that each trace in each coil forms with corresponding traces in other coils.

Figure 9A:
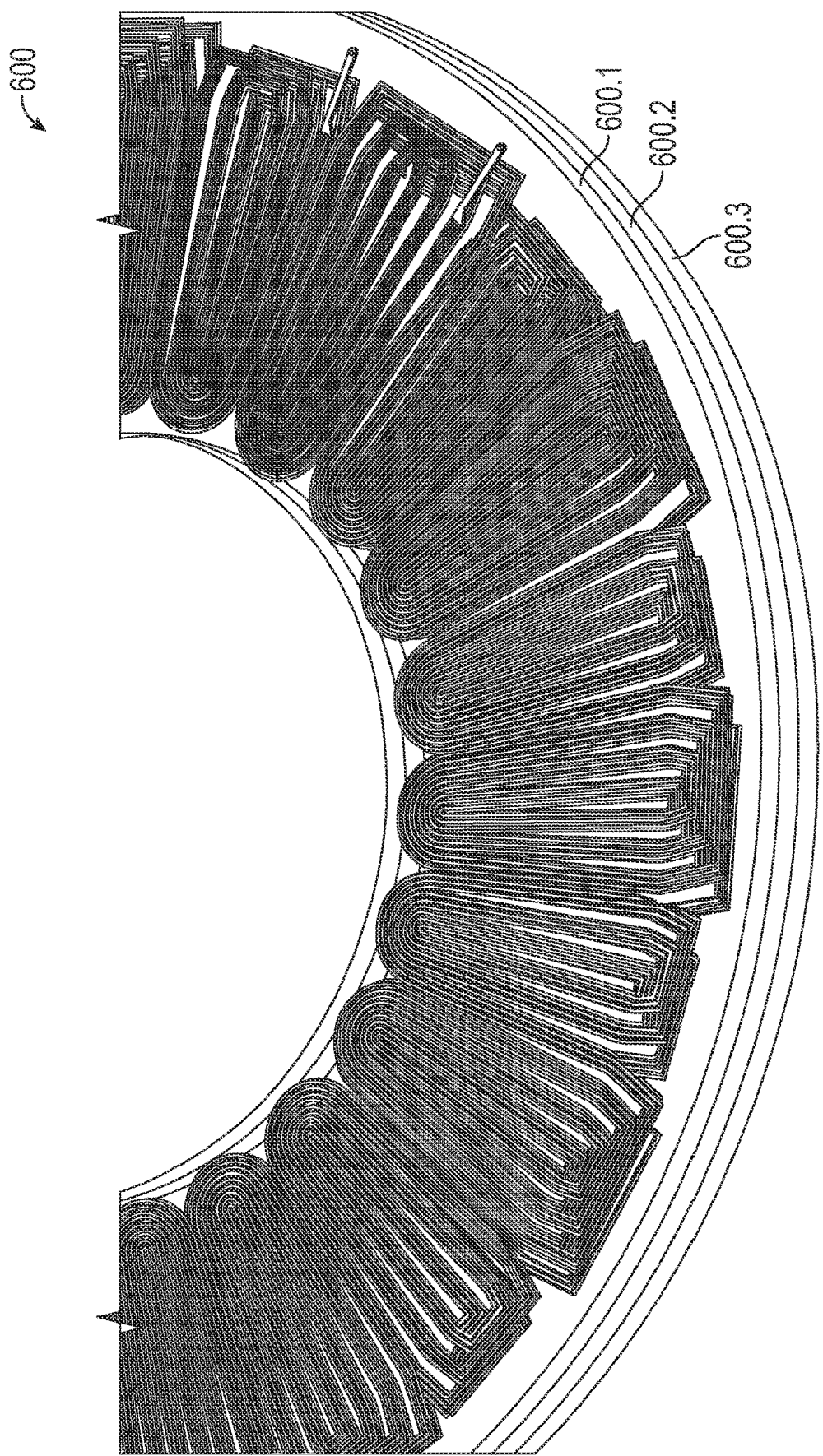
FIG. 9A is a partial, front, isometric view of an embodiment of the PCB stator of FIG. 8A.

Embodiments of the PCB stator 600 can have coils where the number of turns is a multiple of the number of phases. FIG. 9A depicts a partial view of the PCB stator 600 having three panels 600.1, 600.2 and 600.3, and each panel is assigned to one phase. In this embodiment, panels 600.1, 600.2 and 600.3 have one pair of layers each, however other embodiments can have more than one pair of layers.

FIG. 9B shows a detailed view of a portion of the PCB stator 600 where the dielectric structure is not shown for ease of understanding. PCB Stator 600 is 3-phase stator and has coils with 3 turns. There is a 120 electrical degree phase shift between the vias 625.1, 625.2 and 625.3, which can represent the phase shift between panels 600.1, 600.2 and 600.3, respectively. The via extensions 635.1, 635.2 and 635.3 can extend from the vias 625.1, 625.2 and 625.3, respectively, and intersect only the traces associated with the respective phases.

Other embodiments can include one or more of the following items.
1. An axial field rotary energy device, comprising:
   a rotor comprising an axis of rotation and a magnet;
   a stator coaxial with the rotor, the stator comprising printed circuit board (PCB) panels, each PCB panel is assigned to one electrical phase of the device, each PCB panel comprises at least one pair of PCB layers, and each PCB layer comprises coils;
   each coil in each PCB layer of a given PCB panel is circumferentially aligned with a corresponding coil in another PCB layer of the given PCB panel;

one coil in one PCB layer is coupled to a corresponding coil in another PCB layer with a respective via; and a number of turns in each coil is a multiple of a number of electrical phases configured for the device.

2. The device wherein each coil consists of a single trace.

3. The device wherein the stator is configured for three electrical phases, and the number of turns in the coils is a multiple of three.

4. The device wherein each coil comprises traces.

5. The device wherein the traces in each coil are parallel to each other.

6. The device wherein the traces in each coil are not connected to each other except at terminals of a first coil and a last coil of a respective one of the pair of PCB layers.

7. The device wherein the vias connecting two coils in a pair of PCB layers that are assigned to a same electrical phase do not intersect coils in PCB layers that are assigned to other electrical phases.

8. An axial field rotary energy device, comprising:

a rotor comprising an axis of rotation and a magnet;

a stator coaxial with the rotor, the stator comprising printed circuit board (PCB) panels, each PCB panel is assigned to one electrical phase of the device, each PCB panel comprises at least one pair of PCB layers, and each PCB layer comprises coils;

each coil in each PCB layer of a given PCB panel is circumferentially aligned with a corresponding coil in another PCB layer of the given PCB panel;

one coil in one PCB layer is coupled to a corresponding coil in another PCB layer with a respective via;

the vias connecting two coils in a pair of PCB layers that are assigned to a same electrical phase do not intersect coils in PCB layers that are assigned to other electrical phases; and a number of turns in each coil is a multiple of a number of electrical phases configured for the device.

9. The device wherein each coil consists of a single trace.

10. The device wherein the stator is configured for three electrical phases, and the number of turns in the coils is a multiple of three.

11. The device wherein each coil comprises traces.

12. The device wherein the traces in each coil are parallel to each other.

13. The device wherein the traces in each coil are not connected to each other except at terminals of a first coil and a last coil of a respective one of the pair of PCB layers.

14. An axial field rotary energy device, comprising:

a rotor comprising an axis of rotation and a magnet;

a stator coaxial with the rotor, the stator comprising printed circuit board (PCB) panels, each PCB panel is assigned to one electrical phase of the device, each PCB panel comprises at least one pair of PCB layers, and each PCB layer comprises coils;

each coil in each PCB layer of a given PCB panel is circumferentially aligned with a corresponding coil in another PCB layer of the given PCB panel;

one coil in one PCB layer is coupled to a corresponding coil in another PCB layer with a respective via;

each coil comprises traces that are parallel to each other; and a number of turns in each coil is a multiple of a number of electrical phases configured for the device.

15. The device wherein the stator is configured for three electrical phases, and the number of turns in the coils is a multiple of three.

16. The device wherein the traces in each coil are not connected to each other except at terminals of a first coil and a last coil of a respective one of the pair of PCB layers.

17. The device wherein the vias connecting two coils in a pair of PCB layers that are assigned to a same electrical phase do not intersect coils in PCB layers that are assigned to other electrical phases.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top," "bottom," and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

This written description uses examples to disclose the embodiments, including the best mode, and also to enable those of ordinary skill in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

It can be advantageous to set forth definitions of certain words and phrases used throughout this patent document. The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, can mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C.

Also, the use of "a" or "an" is employed to describe elements and components described herein. This is done merely for convenience and to give a general sense of the scope of the invention. This description should be read to include one or at least one and the singular also includes the plural unless it states otherwise.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function.

Benefits, other advantages, and solutions to problems have been described above with regard to specific embodiments. However, the benefits, advantages, solutions to problems, and any feature(s) that can cause any benefit, advantage, or solution to occur or become more pronounced are not to be construed as a critical, required, sacrosanct or an essential feature of any or all the claims.

After reading the specification, skilled artisans will appreciate that certain features which are, for clarity, described herein in the context of separate embodiments, can also be provided in combination in a single embodiment. Conversely, various features that are, for brevity, described in the context of a single embodiment, can also be provided separately or in any sub-combination. Further, references to values stated in ranges include each and every value within that range.

What is claimed is:

1. An axial field rotary energy device, comprising:
   a rotor comprising an axis of rotation and a magnet;
   a stator coaxial with the rotor, the stator comprising printed circuit board (PCB) panels, each PCB panel is assigned to one electrical phase of the device, each PCB panel comprises at least one pair of PCB layers, and each PCB layer comprises coils;
   each coil in each PCB layer of a given PCB panel is circumferentially aligned and coupled with a corresponding coil in another PCB layer of the given PCB panel; and
   each coil comprises traces that are not connected to each other except at terminals of a first coil and a last coil of a respective one of the pair of PCB layers.

2. The device of claim 1, wherein the stator is configured for three electrical phases, and the number of turns in the coils is a multiple of three.

3. The device of claim 1, wherein the traces in each coil are parallel to each other.

4. The device of claim 1, wherein vias connect two coils in a pair of PCB layers that are assigned to a same electrical phase, and the vias do not intersect coils in PCB layers that are assigned to other electrical phases.

5. An axial field rotary energy device, comprising:
   a rotor comprising an axis of rotation and a magnet;
   a stator coaxial with the rotor, the stator comprising printed circuit board (PCB) panels, each PCB panel is assigned to one electrical phase of the device, each PCB panel comprises at least one pair of PCB layers, and each PCB layer comprises coils;
   each coil in each PCB layer of a given PCB panel is circumferentially aligned and coupled with a corresponding coil in another PCB layer of the given PCB panel;
   vias connecting two coils in a pair of PCB layers that are assigned to a same electrical phase do not intersect coils in PCB layers that are assigned to other electrical phases; and
   each coil comprises parallel traces that are not connected to each other except at terminals of a first coil and a last coil of a respective one of the pair of PCB layers.

6. The device of claim 5, wherein the stator is configured for three electrical phases, and the number of turns in the coils is a multiple of three.

7. An axial field rotary energy device, comprising:
   a rotor comprising an axis of rotation and a magnet;
   a stator coaxial with the rotor, the stator comprising printed circuit board (PCB) panels, each PCB panel is assigned to one electrical phase of the device, each PCB panel comprises at least one pair of PCB layers, and each PCB layer comprises coils;
   each coil in each PCB layer of a given PCB panel is circumferentially aligned and coupled with a corresponding coil in another PCB layer of the given PCB panel; and
   each coil comprises traces that are parallel to each other, and the traces in each coil are not connected to each other except at terminals of a first coil and a last coil of a respective one of the pair of PCB layers.

8. The device of claim 7, wherein the stator is configured for three electrical phases, and the number of turns in the coils is a multiple of three.

9. The device of claim 7, further comprising vias connecting two coils in a pair of PCB layers that are assigned to a same electrical phase do not intersect coils in PCB layers that are assigned to other electrical phases.

10. An axial field rotary energy device, comprising:
   a rotor comprising an axis of rotation and a magnet;
   a stator coaxial with the rotor, the stator comprising printed circuit board (PCB) panels, each PCB panel is assigned to one electrical phase of the device, each PCB panel comprises at least one pair of PCB layers, and each PCB layer comprises coils;
   each coil in each PCB layer of a given PCB panel is circumferentially aligned and coupled with a corresponding coil in another PCB layer of the given PCB panel;
   vias that connect two coils in a pair of PCB layers that are assigned to a same electrical phase do not intersect coils in PCB layers that are assigned to other electrical phases; and
   each coil consists of only one trace.

11. The device of claim 10, wherein the stator is configured for three electrical phases, and the number of turns in the coils is a multiple of three.

* * * * *